(12) United States Patent
Tatsuda

(10) Patent No.: US 8,398,061 B2
(45) Date of Patent: Mar. 19, 2013

(54) CLAMPING DEVICE IN MAIN SHAFT DRIVING DEVICE FOR MACHINE TOOL

(75) Inventor: Yoshinori Tatsuda, Kanazawa (JP)

(73) Assignee: Tsudakoma Kogyo Kabushiki Kaisha, Kanazawa-shi, Ishikawa-ken (JP)

( * ) Notice: Subject to any disclaimer, the term of this patent is extended or adjusted under 35 U.S.C. 154(b) by 0 days.

(21) Appl. No.: 13/461,012

(22) Filed: May 1, 2012

(65) Prior Publication Data
US 2012/0217691 A1 Aug. 30, 2012

Related U.S. Application Data

(62) Division of application No. 12/613,042, filed on Nov. 5, 2009.

(30) Foreign Application Priority Data

Nov. 19, 2008 (JP) ................................. 2008-296141

(51) Int. Cl.
| | | |
|---|---|---|
| *B23Q 1/64* | (2006.01) | |
| *B23Q 3/18* | (2006.01) | |
| *B23Q 1/25* | (2006.01) | |
| *B25B 1/22* | (2006.01) | |
| *B25B 1/06* | (2006.01) | |
| *B25B 1/16* | (2006.01) | |
| *B23B 3/16* | (2006.01) | |
| *B23B 7/04* | (2006.01) | |

(52) U.S. Cl. .............. 269/57; 269/74; 269/63; 269/216; 29/40; 74/813 C; 74/813 L

(58) Field of Classification Search ............... 269/57, 269/74, 55, 32, 309, 310, 63, 73
See application file for complete search history.

(56) References Cited

U.S. PATENT DOCUMENTS

| 6,240,807 B1* | 6/2001 | Hebener et al. ............... 269/63 |
| 7,418,889 B2* | 9/2008 | Nitta ........................... 74/813 L |
| 2008/0125904 A1* | 5/2008 | Osaki et al. ..................... 29/40 |
| 2009/0235783 A1* | 9/2009 | Duane et al. ............... 74/813 C |
| 2010/0019427 A1* | 1/2010 | Nishida ........................ 269/74 |

FOREIGN PATENT DOCUMENTS

| DE | 4430897 A1 | 3/1996 |
| DE | 102006021344 A1 | 11/2007 |
| EP | 1088616 A2 | 4/2001 |
| JP | 2006-95668 A | 4/2006 |

* cited by examiner

Primary Examiner — Monica Carter
Assistant Examiner — Seahee Yoon
(74) Attorney, Agent, or Firm — Westerman, Hattori, Daniels & Adrian, LLP

(57) ABSTRACT

A clamping device in a main shaft driving device for a machine tool, which rotationally drives a main shaft, wherein the main shaft is rotatably supported by a frame. The clamping device includes a clamp piston, a pressure chamber and an operating fluid supplying mechanism, wherein the clamp piston has a first pressure-receiving surface and a second pressure-receiving surface, the first pressure-receiving surface receiving the spring force of a spring member, the second pressure-receiving surface receiving pressure of an operating fluid, wherein the operating fluid supplying mechanism includes a switching portion that selectively supplies the corresponding operating fluid from a common operating fluid supply source to at least one of a first pressure chamber and a second pressure chamber.

1 Claim, 9 Drawing Sheets

CLAMPING DEVICE IN MAIN SHAFT DRIVING DEVICE FOR MACHINE TOOL

CROSS-REFERENCE OF RELATED APPLICATIONS

This application is a Divisional of application Ser. No. 12/613,042, filed Nov. 5, 2009, which claims priority of Japanese Patent Application No. 2008-296141, the contents of which are incorporated herein by reference.

BACKGROUND OF THE INVENTION

1. Field of the Invention

The present invention relates to a clamping device in a main shaft driving device for a machine tool. More particularly, the present invention relates to a clamping device in a machine-tool main shaft driving device that rotationally drives by a driving device a main shaft rotatably supported by a frame and having a member that is rotationally driven secured to one end thereof. This clamping device includes a braking member, a pressure chamber, and an operating fluid supplying mechanism. The braking member is provided at a side of the frame, and has a pressure-receiving surface and a braking portion. The pressure-receiving surface receives pressure of an operating fluid. The braking portion causes a press-contact force to act upon the main shaft. The pressure chamber is formed by the pressure-receiving surface and the frame. The operating fluid supplying mechanism is provided for supplying the operating fluid from an operating fluid supply source to the pressure chamber. In this clamping device, the press-contact force is caused to act upon the main shaft by displacing the braking portion towards the main shaft by the pressure of the operating fluid that is supplied to the pressure chamber.

2. Description of the Related Art

As a main shaft driving device used in a machine tool, there is a rotation indexing table device that rotationally drives a circular table, on which, for example, a workpiece is placed, through a main shaft. The rotation indexing table device is used for indexing an angular position of the main shaft (circular table) by rotationally driving the main shaft, and processing a workpiece at the indexed angular position. Therefore, the rotation indexing table device includes a clamping device for maintaining the indexed angular position.

A related art of such a rotation indexing table device including a clamping device described above is discussed in Japanese Unexamined Patent Application Publication No. 2006-95668 (Patent Document 1). As driving means of a circular table, the rotation indexing table device in Patent Document 1 uses a direct-drive motor (hereunder referred to as "DD motor") that rotationally drives the main shaft without using drive transmitting means such as a gear. In addition, the rotation indexing table device in Patent Document 1 includes as a clamping device a disc clamping device in which a brake plate (clamp disc) is mounted to the circular plate (secured to the main shaft that is rotationally driven by the DD motor) so as to be incapable of relative rotation; and in which a piston is urged towards the brake plate by operating fluid and the brake plate is held by cooperation of a frame and the piston.

More specifically, the clamping device in the rotation indexing table device in Patent Document 1 switches between a clamped state and an unclamped state of the circular table by introducing operating fluid. The piston is normally urged towards the brake plate by a compression spring, and stops rotation of the table by friction as a result of contacting the brake plate while introduction of operating fluid is stopped. When the table is rotated, the operating fluid is introduced, and the piston is moved against urging force of the compression spring to set the circular table in the unclamped state.

Accordingly, in the related main shaft driving device, the clamping device is generally set in the unclamp state when the main shaft is rotated. Even when a finishing operation is performed while continuously rotating the workpiece, the operation is performed while the clamping device is in the unclamp state.

When the finishing operation is performed while continuously rotating the workpiece, the main shaft driving device receives a load from a cutter that processes the workpiece. This load constantly varies even under a constant processing condition. Therefore, rotation state of the main shaft driving device is affected by the variations in the load that is received from the cutter.

When the DD motor is used as the driving means of the main shaft as in the rotation indexing table device discussed in Patent Document 1, control of the DD motor is carried out while correcting deviation of rotational angle (amount of rotation) of the main shaft driving device occurring due to the main shaft driving device being influenced by the load that it receives from the cutter as mentioned above, on the basis of feedback of the rotational angle (the amount of rotation) from a rotation detector of the main shaft driving device. However, due to the variations in the load received from the cutter, the rotation of the DD motor resulting from the control may not be able to follow the deviation. Therefore, the rotation of the DD motor is not necessarily uniform, and may include pulsation. In addition, when a speed reducer including gears is used as the driving means of the main shaft, the rotation state of the main shaft may include pulsation in a backlash range of the gears due to the influence of the variations in load that is received from the cutter.

As a result, pulsation occurs in the rotation state of the main shaft driving device, thereby deteriorating surface roughness of a finished surface of the workpiece.

When the clamping device is in the unclamp state, the rigidity of the main shaft of the main shaft driving device primarily depends upon the rigidities of the bearings. The rigidities of the bearings depend largely upon compression of the bearings. Therefore, when the rigidity of the main shaft is required, the compression of the bearings is made large. However, in order to withstand the large compression, the bearings themselves need to be large. When the bearings are made large, deflection precision is reduced. Therefore, indexing precision is reduced, as a result of which processing precision is reduced. In addition, since the larger the diameters of the bearings, the higher the cost, manufacturing cost of the device is increased.

SUMMARY OF THE INVENTION

Accordingly, it is an object of the present invention to provide a structure in the aforementioned main shaft driving device, in which pulsation in a rotation state of the main shaft driving device is reduced when a finishing operation is performed while continuously rotating a workpiece, and in which rigidity of the main shaft is increased even if a bearing is not made large.

A first aspect of the present invention presupposes a clamping device in a main shaft driving device for a machine tool. The main shaft driving device rotationally drives a main shaft by a driving device. The main shaft is rotatably supported by a frame and has a member that is rotationally driven secured to an end portion thereof. The clamping device includes a braking member, a pressure chamber, and an operating fluid supplying mechanism, the braking member provided at a side of the frame and including a pressure-receiving surface and a braking portion, the pressure-receiving surface receiving pressure of an operating fluid, the braking portion causing a press-contact force to act upon the main shaft, the pressure chamber being formed by the pressure-receiving surface and the frame, the operating fluid supplying mechanism being provided for supplying the operating fluid from an operating fluid supply source to the pressure chamber, wherein the press-contact force is caused to act upon the main shaft by displacing the braking portion towards the main shaft by the pressure of the operating fluid that is supplied to the pressure chamber.

On the basis of the aforementioned object, according to the first aspect directed to the clamping device, the clamping device is such that the braking member has a first pressure-receiving surface and a second pressure-receiving surface, which extend orthogonally to a direction in which the braking portion causes press-contact forces to act upon the main shaft; the operating fluid supplying mechanism includes a switching portion that selectively supplies the operating fluid from a common operating fluid supply source to at least one of first and second pressure chambers, the first pressure chamber being formed by the first pressure-receiving surface and the frame, the second pressure chamber being formed by the second pressure-receiving surface and the frame; and the braking member is formed so that the braking portion causes the press-contact forces that differ from each other to act upon the main shaft when pressures of the operating fluid that are equal to each other act upon the first pressure-receiving surface and second pressure-receiving surface, respectively.

In the clamping device according to the first aspect, the braking member may be such that the braking portion causes the press-contact force to act upon the main shaft when the pressure of the operating fluid acts upon the second pressure-receiving surface, the press-contact force causing the main shaft to be set in a partially clamped state; and, when the main shaft is to be set in a completely clamped state, the operating fluid supplying mechanism may be such as to supply the operating fluid to at least the first pressure chamber by the switching portion. Further, the braking member may be formed so that the area of the first pressure-receiving surface and the area of the second-pressure receiving surface differ from each other.

A second aspect of the present invention presupposes another clamping device in a main shaft driving device for a machine tool. The main shaft driving device rotationally drives a main shaft by a driving device. The main shaft is rotatably supported by a frame and has a member that is rotationally driven secured to an end portion thereof. The clamping device includes a clamp piston, a pressure chamber, and an operating fluid supplying mechanism, the clamp piston being provided so as to be displaceable in an axial direction of the main shaft with respect to the frame, the clamp piston including a pressure-receiving surface and a braking portion, the pressure-receiving surface receiving pressure of an operating fluid, the braking portion causing a press-contact force to act upon the main shaft, the pressure chamber being formed by the pressure-receiving surface and the frame, the operating fluid supplying mechanism being provided for supplying the operating fluid from an operating fluid supply source to the pressure chamber, wherein the press-contact force is caused to act upon the main shaft by displacing the clamp piston towards the main shaft by the pressure of the operating fluid that is supplied to the pressure chamber.

According to the second aspect directed to the clamping device, the clamping device includes a spring member that urges the clamp piston in a first direction, which is the same as a direction in which the braking portion causes the press-contact force to act upon the main shaft, the spring member causing a spring force to act upon the pressure-receiving surface, the spring force causing the press-contact force that causes the main shaft to be set in a partially clamped state to act upon the main shaft by the braking portion; the clamp piston has a first pressure-receiving surface and a second pressure-receiving surface, the first pressure-receiving surface extending in a second direction that is orthogonal to the first direction and receiving pressure of an operating fluid in the first direction, the first pressure-receiving surface receiving the spring force of the spring member, the second pressure-receiving surface extending in the second direction and receiving pressure of an operating fluid in a direction opposite to the first direction; and the operating fluid supplying mechanism includes a switching portion that selectively supplies the corresponding operating fluid from a common operating fluid supply source to at least one of the first and second pressure chambers, the first pressure chamber being formed by the first pressure-receiving surface and the frame, the second pressure chamber being formed by the second pressure-receiving surface and the frame.

According to the first aspect of the present invention, the braking member has a first pressure-receiving surface and a second pressure-receiving surface, which extend orthogonally to a direction in which the braking portion causes press-contact forces to act upon the main shaft; the operating fluid supplying mechanism includes a switching portion that selectively supplies the operating fluid from a common operating fluid supply source to at least one of first and second pressure chambers, the first pressure chamber being formed by the first pressure-receiving surface and the frame, the second pressure chamber being formed by the second pressure-receiving surface and the frame; and the braking member is formed so that the braking portion causes the press-contact forces that differ from each other to act upon the main shaft when pressures of the operating fluid that are equal to each other act upon the first pressure-receiving surface and second pressure-receiving surface, respectively. By virtue of this structure, it is possible for the braking portion of the clamping device to cause different press-contact forces to act upon the main shaft by selectively supplying operating fluids of the same pressure from the common operating fluid supply source without adjusting the pressure of the operating fluid.

Therefore, if the braking portion causes a press-contact force that causes the main shaft to be in the clamped state to act upon the main shaft when the pressure of the operating fluid acts upon one of the pressure-receiving surfaces (such as the second pressure-receiving surface), the main shaft can be easily set in the partially clamped state by only selectively switching the supply of the operating fluid. Here, the term "partially clamped state" refers to a state in which the clamping device causes a press-contact force that applies rotational resistance allowing rotation of the main shaft to act upon the main shaft.

According to the second aspect of the present invention, the clamping device includes a spring member that urges the clamp piston in a first direction, which is the same as a direction in which the braking portion causes the press-contact force to act upon the main shaft, the spring member causing a spring force to act upon the pressure-receiving surface, the spring force causing the press-contact force that causes the main shaft to be set in a partially clamped state to act upon the main shaft by the braking portion; the clamp piston has a first pressure-receiving surface and a second pressure-receiving surface, the first pressure-receiving surface extending in a second direction that is orthogonal to the first direction and receiving pressure of an operating fluid in the first direction, the first pressure-receiving surface receiving the spring force of the spring member, the second pressure-receiving surface extending in the second direction and receiving pressure of an operating fluid in a direction opposite to the first direction; and the operating fluid supplying mechanism includes a switching portion that selectively supplies the corresponding operating fluid from a common operating fluid supply source to at least one of the first and second pressure chambers, the first pressure chamber being formed by the first pressure-receiving surface and the frame, the second pressure chamber being formed by the second pressure-receiving surface and the frame. By virtue of this structure, a press-contact force that sets the main shaft in the normally partially clamped state acts upon the main shaft. By causing the pressure of the operating fluid to act upon the second pressure-receiving surface, it is possible to cause the main shaft to be set in the unclamped state, in which the clamp piston is displaced towards the second direction against the spring force of the spring member so that a press-contact force does not act upon the main shaft. In addition, by causing the pressure of the operating fluid to act upon the first pressure-receiving surface, the clamp piston is urged towards the first direction by the pressure of the operating fluid as well as by the spring force of the spring member, so that the main shaft can be in the completely clamped state. In this way, according to the second invention, the partially clamped state, the completely clamped state, and the unclamped state can be easily realized by only selectively switching the supply of operating fluid without adjusting the pressure of the operating fluid.

In addition, if a finishing operation is performed on a workpiece while continuously rotating the workpiece by the main shaft driving device when the main shaft is in the partially clamped state, variations in load that the main shaft driving device receives from the cutter that processes the workpiece can be restricted by rotational resistance. This makes it possible to reduce pulsation in the control of the DD motor and pulsation within a gear backlash range, so that the rotational state of the main shaft driving device can be made stabilized to a uniform state.

Further, since the clamping device provides rigidity to the main shaft in the main shaft driving device, it is possible to increase the rigidity of the main shaft without increasing the size of the bearing. As a result, it is possible to provide good surface roughness of a finished surface of the workpiece. In addition, it is possible to use a workpiece that is larger than a related workpiece using a bearing of the same diameter. Accordingly, since a bearing having a small diameter can be used, a high processing precision can be realized, and manufacturing costs of the main shaft driving device for a machine tool can be reduced.

DESCRIPTION OF THE PREFERRED EMBODIMENTS

Figure 1:
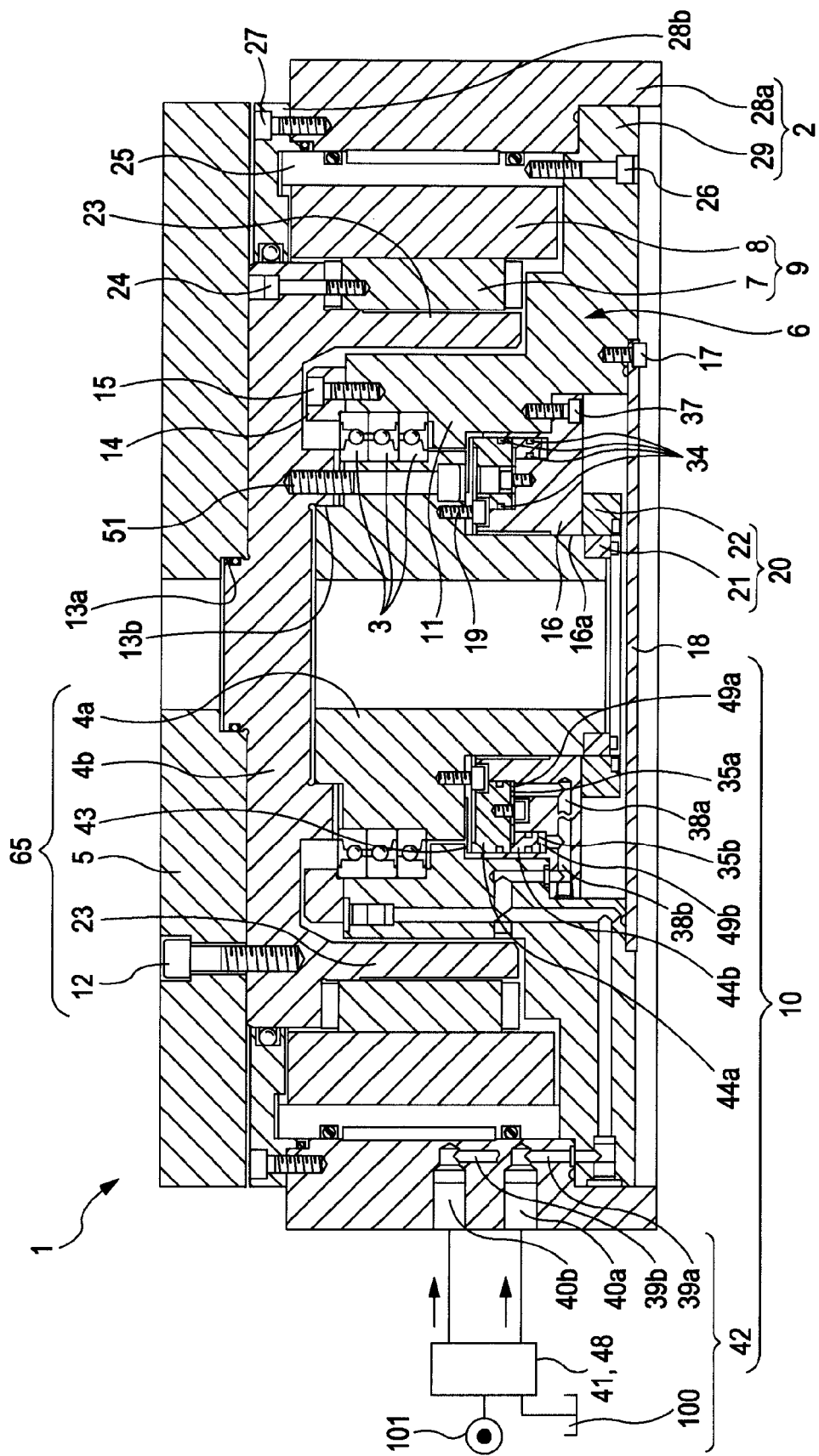
FIG. 1 is a side view of a first embodiment of a rotational resistance device of a main shaft driving device for a machine tool.
Figure 2:
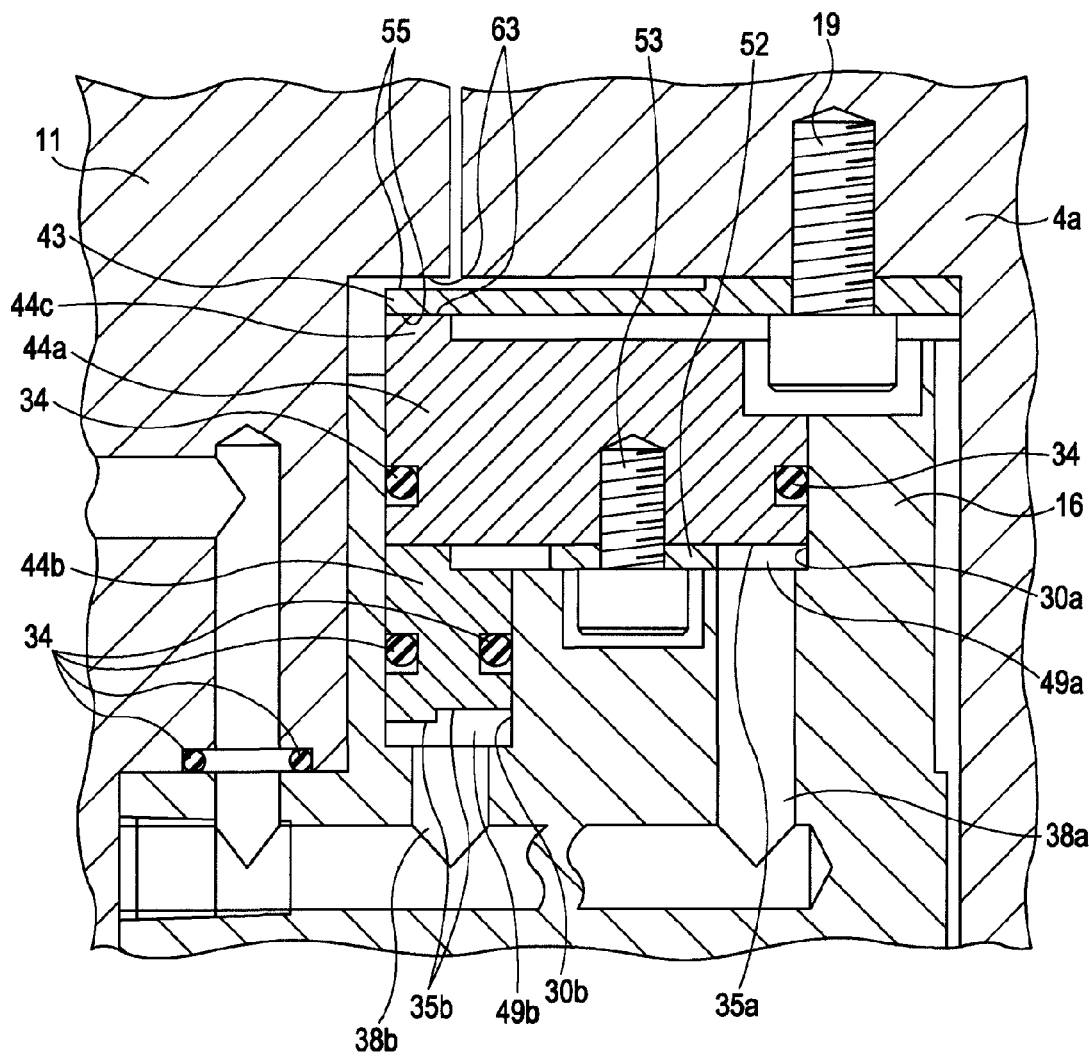
FIG. 2 is an enlarged explanatory diagram of the first embodiment of the rotational resistance device of the main shaft driving device for the machine tool.

FIGS. 1 and 2 each show a rotation indexing table device 1 serving as a main shaft driving device for a machine tool according to the present invention. FIG. 1 is a general view thereof. In the description below, "axial direction" refers to an axial direction of a main shaft 4a that supports a circular table 5 serving as a member that is rotationally driven, and "radial direction" refers to a radial direction of the circular table 5 and the main shaft 4a, which are concentrically disposed.

In FIG. 1, the rotation indexing table device 1 includes a main shaft 4a, which is rotatably supported by a frame 2 and which has the member that is rotationally driven secured to one end thereof; a driving device 6 for rotationally driving the main shaft 4a; and a clamping device 10, which maintains an indexed rotational angle of the main shaft 4a. The frame 2 is such that a portion serving as a surface for setting to the machine tool is a flat surface. The frame 2 is provided with a cylindrical base portion 11 that surrounds the main shaft 4a.

The frame 2 is formed by separately forming casing members 28a and 28b and a base member 29 having the cylindrical base portion 11 formed thereat and by assembling these with a plurality of mounting bolts 27. However, the cylindrical base portion 11 may be formed as a separate member, and may be mounted with, for example, a bolt.

The main shaft 4a is inserted into the cylindrical base portion 11 in the frame 2, and is rotatably supported to the frame 2 by bearings 3. A flange 4b and the circular table 5, serving as the member that is rotationally driven, are mounted to one end of the main shaft 4a. The other end of the main shaft 4a is inserted into a hole 16a of a disc-shaped projecting portion 16, mounted to the inner peripheral side of the base member 29 with a plurality of mounting bolts 37, and projects out from the hole 16a.

The circular table 5 is fitted to a circular-table-side end surface (upper surface in FIG. 1) of the flange 4b at a center hole 13a. With the circular table 5 being positioned with respect to the flange 4b by the fitting operation, the circular table 5 is mounted to the aforementioned end surface of the flange 4b by a plurality of mounting bolts 12. The flange 4b is fitted to one end of the main shaft 4a at a center hole 13b. With the flange 4b being positioned with respect to the main shaft 4a by the fitting operation, the flange 4b is mounted to an end surface of the main shaft 4a by a plurality of mounting bolts 51. A cylindrical holding portion 23 extending in the axial direction of the main shaft 4a from an end surface opposite to the aforementioned end surface is integrally formed with the flange 4b. The holding portion 23 surrounds the base portion 11. The holding portion 23 and the flange 4b are formed separately from the circular table 5, and are secured to the circular table 5. However, the holding portion 23 and the flange 4b may be integrally formed with the circular table 5. The holding portion 23 may be integrally formed with the main shaft 4a.

The main shaft 4a is supported by the bearings 3 provided between the outer peripheral surface of the main shaft 4a and the inner peripheral surface of the base portion 11. In the illustrated embodiment, three bearings 3 are combined with each other and provided for supporting the main shaft 4a. With an inner ring side of the bearings 3 being interposed between a stepped portion of the outer peripheral surface of the main shaft 4a and a portion surrounding the center hole 13b of the flange 4b, the bearings 3 are secured to the main shaft 4a. With an outer ring side of the bearings 3 being interposed between a stepped portion of the inner peripheral surface of the base portion 11 and an annular bearing holder 14, mounted to an end surface of the base portion 11 by a mounting bolt 15, the bearings 3 are secured to the base portion 11.

A sliding disc 43 that receives a press-contact force by the clamping device (described later) is mounted to the main shaft 4a. The sliding disc 43 is a resiliently deformable member formed of a disc-shaped thin plate, and is secured to the main shaft 4a by a mounting bolt 19 at the inner peripheral portion of the sliding disc 43. The sliding disc 43 is disposed such that a circular-table-5-side of the outer peripheral portion of the sliding disc 43 faces a surface 63 at a side opposite to the circular table 5 in the axial direction of the stepped portion of the base portion 11. A surface at a side opposite to the circular table 5 of the sliding disc 43 faces a circular-table-5-side surface of the projecting portion 16 mounted to the base member 29. The surface 63 at the side opposite to the circular table 5 at the stepped portion of the base portion 11 corresponds to what is called a clamp surface, which is a surface where the sliding disc 43 is pressed and contacted when the sliding disc 43 receives a press-contact force from the clamping device as mentioned above.

Further, a detection ring 21 that constitutes a portion of a rotation detector 20 is mounted to the other end of the main shaft 4a that projects out from the hole 16a of the projecting portion 16. The rotation detector 20 detects the rotational angle (amount of rotation) of the main shaft 4a. The rotation detector 20 includes the aforementioned detection ring 21, mounted to the main shaft 4a, and a detection sensor 22, mounted to the projecting portion 16 at a side of the frame 2. A space at the outer periphery of the main shaft 4a at the other end side of the main shaft 4a where the rotation detector 20 is provided is covered with a cover member 18 mounted to the base member 29 by a mounting bolt 17.

In the illustrated embodiment, as the driving device 6, a DD motor 9 that rotationally drives the main shaft without driving transmitting means, such as a gear, is used. That is, in the embodiment, the DD motor 9 corresponds to the driving device according to the present invention. The DD motor 9 is disposed concentrically with the main shaft 4a in the axial direction of the main shaft 4a. The DD motor 9 includes a motor rotor 7, provided at the main shaft 4a so as to be incapable of rotating relatively thereto, and a motor stator 8, disposed so as to surround the motor rotor 7 and provided at the frame 2 so as to be incapable of rotating relatively thereto. That is, the illustrated DD motor 9 is what is called an inner rotor type. The DD motor 9 is connected to a controlling device (not shown) of the machine tool, and driving thereof is controlled by the controlling device.

With the motor rotor 7 being fitted to the outer peripheral surface of the holding portion 23 at the flange 4b, the motor rotor 7 is mounted to the flange 4b with a mounting bolt 24, inserted from the side of the flange 4b, so as to be incapable of rotating relatively thereto. Therefore, the motor rotor 7 is incapable of rotating relatively to the main shaft 4a to which the circular table 5 is secured.

With the inner peripheral surface of the motor stator 8 facing the outer peripheral surface of the motor rotor 7 and with a slight gap being formed between it and the outer peripheral surface of the motor rotor 7, the motor stator 8 is mounted to the frame 2. More specifically, a stator sleeve 25 is fitted to the inner peripheral surface of the casing member 28a in the frame 2, and the motor stator 8 is fitted to the inner peripheral surface of the stator sleeve 25 so as to be incapable of rotating relatively thereto. The stator sleeve 25 is mounted to the frame 2 by a mounting bolt 26 inserted from the base-member-29 side of the frame 2. Therefore, the motor stator 8 is incapable of rotating relatively to the frame 2 in the frame 2.

The clamping device 10 includes an annular clamp piston (serving as a braking member), a first pressure chamber 49a, a second pressure chamber 49b, and an operating fluid supplying mechanism 42. That is, in the embodiment, the clamping device 10 is a disc-type clamping device in which the braking member is a clamp piston, the clamp piston causes a press-contact force to act upon the sliding disc 43, and rotational resistance is applied to the sliding disc 43 by the clamp piston and the clamp surface 63.

In the illustrated embodiment, the clamp piston serving as a braking member includes a first piston member 44a and a second piston member 44b. The first piston member 44a is accommodated in an annular first groove 30a of the projecting portion 16 so as to be movable in the axial direction. The first groove 30a is formed so as to open at a sliding-disc-43-side in a portion facing the sliding disc 43 of the projecting portion 16. Therefore, the first piston member 44a accommodated in the first groove 30a is such that a circular-table-5-side end surface (=sliding-disc-43-side end surface) faces the sliding disc 43.

The first piston member 44a has an annular projection provided at a portion thereof at the outer peripheral side of the sliding-disc-43-side end surface so as to face the clamp surface 63. The projecting portion contacts the sliding disc 43 and causes a press-contact force to act thereupon when the first piston member 44a is displaced towards the sliding disc 43, and corresponds to a braking portion 44c according to the present invention. In addition, in the embodiment, the braking portion 44c causes a press-contact force to act upon the sliding disc 43 towards the circular table 5 in the axial direction. This direction corresponds to what is called in the invention "direction in which a press-contact force acts upon the main shaft 4a," and is hereunder referred to as "clamp direction." An end surface at a side opposite to the sliding disc 43 of the first piston member 44a corresponds to a first pressure-receiving surface 35a extending orthogonally to the clamp direction. In addition, a space surrounded by the first pressure-receiving surface 35a and the first groove 30a corresponds to the first pressure chamber 49a to which operating fluid for displacing the first piston member 44a (braking portion 44c) is supplied.

A return disc 52 is provided at a location between the pressure-receiving surface 35a and a sliding-disc-43-side surface of the projecting portion 16. The return disc 52 is an elastically deformable member formed of a substantially donut-shaped thin plate provided with a plurality of mounting holes (not shown) in a plane. Using mounting bolts 53, the mounting holes adjacent to each other are alternately mounted to the first piston member 44a and the projecting portion 16. Therefore, the return disc 52 connects the first piston member 44*a* and the projecting portion 16 so as to be incapable of rotating relatively to each other, and the first piston member 44*a* is kept at a withdrawal position by resilient force of a portion between the mounting holes adjacent to each other.

The second piston member 44*b* is accommodated in an annular second groove 30*b* of the projecting portion 16 so as to be movable in the axial direction. The second groove 30*b* is formed so that, at the outer peripheral side of the first groove 30*a*, the first groove 30*a* and the outer side surface thereof are aligned with each other and the second groove 30*b* opens into the bottom surface of the first groove 30*a*. That is, the second groove 30*b* is formed so that its inside diameter is larger than the inside diameter of the first groove 30*a* and so that the inner surface of the second groove 30*b* is positioned outwardly of the inner surface of the first groove 30*a* in the radial direction. Therefore, the second piston member 44*b* accommodated in the second groove 30*b* is provided so that its sliding-disc-43-side end surface faces the first pressure-receiving surface 35*a* at the first groove 30*a*. The second piston member 44*b* is a member whose inside diameter is larger than that of the first piston member 44*a*.

The second piston member 44*b* has an projection provided at a portion thereof at the outer peripheral side of the sliding-disc-43-side end surface in correspondence with the braking portion 44*c* of the first piston member 44*a* in the radial direction. Therefore, the second piston member 44*b* can contact the first piston member 44*a* at its projecting portion. The displacement of the second piston member 44*b* causes the first piston member 44*a* to receive a press-contact force from the projecting portion of the second piston member 44*b*.

An end surface at a side opposite to the sliding disc 43 of the second piston member 44*b* corresponds to a second pressure-receiving surface 35*b* extending orthogonally to the clamp direction. In addition, a space surrounded by the second pressure-receiving surface 35*b* and the second groove 30*b* corresponds to the second pressure chamber 49*a* to which operating fluid for displacing the second piston member 44*b* is supplied.

As mentioned above, the second groove 30*b* is formed so as to open into the bottom surface of the annular first groove 30*a*. That is, the area of the bottom surface of the second groove 30*b* is smaller than the area of the bottom surface of the annular first groove 30*a*. Therefore, the second pressure-receiving surface 35*b* in the second piston member 44*b* accommodated in the second groove 30*b* is smaller than the first pressure-receiving surface 35*a* in the first piston member 44*a* accommodated in the first groove 30*a*.

Further, the area of the first pressure-receiving surface 35*a* is one in which the action of a predetermined pressure of an operating fluid causes a press-contact force which causes the main shaft 4*a* to be in a completely clamped state to act upon the main shaft 4*a* (the sliding disc 43) by the braking portion 44*c*. The area of the second pressure-receiving surface 35*b* is one in which a predetermined pressure of the operating fluid causes a press-contact force which causes the main shaft 4*a* to be in a partially clamped state to act upon the main shaft 4*a* (the sliding disc 43) by the braking portion 44*c*.

The operating fluid supplying mechanism 42 includes a first port 40*a* and a second port 40*b* (formed in the frame 2) a fluid supplying device 41 connected to a first flow path 38*a* and a second flow path 38*b* (communicating with the first pressure-receiving surface 35*a* and the second pressure-receiving surface 35*b*, respectively) and to an operating fluid supply source 101, and a first communicating path 39*a* and a second communicating path 39*b* (causing the first port 40*a* and the second port 40*b* to communicate with the first flow path 38*a* and the second flow path 38*b*, respectively).

More specifically, the first flow path 38*a* is formed in the projecting portion 16, and communicates with the first pressure chamber 49*a* at a location facing the first pressure-receiving surface 35*a*. In addition, the first flow path 38*a* communicates with the first port 40*a* (formed so as to open towards the outer surface of the casing member 28*a*) through the first communicating path 39*a* (formed in the casing member 28*a*). The first port 40*a* is connected to the fluid supplying device 41 provided separately from the frame 2.

The second flow path 38*b* is formed in the projecting portion 16, and communicates with the second pressure chamber 49*b* at a location facing the second pressure-receiving surface 35*b*. In addition, the second flow path 38*b* communicates with the second port 40*b* (formed so as to open towards the outer surface of the casing member 28*a*) through the second communicating path 39*b* (formed in the casing member 28*a*). The second port 40*b* is connected to the fluid supplying device 41 provided separately from the frame 2.

The fluid supplying device 41 includes a selector valve (not shown), which is controlled by the controlling device of the machine tool. One side of the valve is connected to the operating fluid supply source 101 and a tank 100 through fluid paths, and the other side of the valve is connected to the first port 40*a* and the second port 40*b* through fluid paths. The fluid supplying device 41 supplies operating fluid having a predetermined pressure from the common operating fluid supply source 101 to the first port 40*a* or the second port 40*b* by selectively switching between the first port 40*a* and the second port 40*b* by the selector valve. Accordingly, the fluid supplying device 41 selectively supplies the operating fluid having the predetermined pressure to at least one of the first and second pressure chambers. Therefore, the fluid supplying device 41 corresponds to a switching portion 48 according to the present invention.

The fluid supplying device 41 is not limited to one that supplies operating fluids to the first port 40*a* and the second port 40*b* under the same pressure. The fluid supplying device 41 may adjust the pressure supplied to one of the first port 40*a* and the second port 40*b* for adjusting either one of the press-contact force that causes the main shaft 4*a* to be in the completely clamped state and the press-contact force that causes the main shaft 4*a* to be in the partially clamped state.

Next, the operation of the rotation indexing device 1 shown in FIGS. 1 and 2 will be described. First, in the rotation indexing device 1, when the circular table 5 is rotationally driven, the DD motor 9 is excited by control of the controlling device of the machine tool. By generation of a rotating magnetic field due to the excitation, the motor rotor 7 causes the main shaft 4*a*, the flange 4*b*, and the circular table 5 to rotate. The rotational angle (amount of rotation) of the circular table 5 at this time is detected by the rotation detector 20.

When a workpiece on the circular table 5 is processed while rotating the main shaft 4*a* by a preset rotational angle and indexing the angular position of the main shaft 4*a*, the rotation indexing table 1 is such that the main shaft 4*a* is kept at the indexed angular position by the clamping device 10 so as to be unrotatable. More specifically, after indexing the angular position of the main shaft 4*a* by driving the DD motor 9, the controlling device of the machine tool causes operating fluid to be supplied to only the first port 40*a* by the selector valve (not shown) of the fluid supplying device 41 (switching portion 48) of the operating fluid supplying mechanism 42.

This causes the pressure of the operating fluid to act upon the first pressure chamber 49*a*. The entire first pressure-receiving surface 35*a* receives the pressure of the operating fluid, so that the first piston member 44a is displaced towards the sliding disc 43. This causes the clamp surface 63, provided at the end of the braking portion 44c at the first piston member 44a, to press-contact one of sliding surfaces 55 of the sliding disc 43, so that the sliding disc 43 is flexed and deformed. The other sliding surface 55 of the sliding disc 43 comes into contact with the clamp surface 63 at the base portion 11. As a result, the braking portion 44c causes a press-contact force to act upon the sliding disc 43 serving as a portion of the main shaft 4a.

The press-contact force that the braking portion 44c of the first piston member 44a causes to act upon the sliding disc 43 at this time corresponds to the pressure that the entire first pressure-receiving surface 35a receives from the operating fluid. As mentioned above, the area of the first pressure-receiving surface 35a is one in which a predetermined pressure causes the press-contact force which causes the main shaft 4a to be in a completely clamped state to act upon the sliding disc 43. Therefore, frictional resistance generated between the clamp surfaces 63 and the sliding surfaces 55 at this time does not allow rotational resistance applied to the main shaft 4a by the clamping device 10 to rotate the main shaft 4a, so that the clamping device 10 causes the main shaft 4a to be in the completely clamped state. That is, the clamping device 10 functions as a device that maintains the angular position of the main shaft 4a of the rotation indexing table device 1.

When the fluid supplying device 41 (switching portion 48) causes the flow path to communicate with the tank 100, the pressure of the operating fluid no longer acts upon the first pressure chamber 49a, thereby reducing the internal pressure of the first pressure chamber 49a. By this, the pressure of the operating fluid also no longer acts upon the first pressure-receiving surface 35a, as a result of which the braking portion 44c of the first piston member 44a no longer causes the press-contact force to act upon the sliding disc 43. Therefore, the first piston member 44a is returned to the withdrawal position by resilient force of the sliding disc 43 and resilient force of the return disc 52. By this, the clamp surfaces 63 and the sliding surfaces 55 are separated from each other, so that the clamping device 10 of the rotation indexing table device 1 is in an unclamp state.

When a finishing operation is performed on a workpiece while rotating the circular table 5 in the rotation indexing table device 1, the fluid supplying device 41 (switching portion 48) is controlled by the controlling device of the machine tool as in the previous example, so that operating fluid is supplied to the second port 40b.

This causes the pressure of the operating fluid to act upon the second pressure chamber 49b, the second pressure-receiving surface 35b to receive the pressure of the operating fluid, the second piston member 44b to be displaced towards the sliding disc 43, and an end of the second piston member 44b to press the end surface at the side opposite to the sliding disc 43 at the first piston member 44a, that is, the first pressure-receiving surface 35a. This also causes the first piston member 44a to be displaced towards the sliding disc 43, the clamp surface 63 (braking surface) at the end of the braking portion 44c at the first piston member 44a to contact one of the sliding surfaces 55 of the sliding disc 43, and the second piston member 44b to press-contact the sliding disc 43 through the first piston. Then, the sliding disc 43 receives a press-contact force by the second piston member 44b through the first piston member 44a, and, thus, is flexed and deformed. In addition, the other sliding surface 55 contacts the clamp surface 63 (braking surface) at the base portion 11.

Regarding the press-contact force of the second piston member 44b at this time, as mentioned above, the area of the second pressure-receiving surface 35b of the second piston member 44b is smaller than the area of the first pressure-receiving surface 35a of the first piston member 44a. Therefore, even if pressure that is the same as that acting upon the first pressure chamber 49a acts upon the second pressure chamber 49b when the main shaft 4a is set in the completely clamped state, the press-contact force that the second piston member 44b causes to act upon the sliding disc 43 is smaller than the press-contact force that the first piston member 44a causes to act upon the sliding disc 43 when the main shaft 4a is set in the completely clamped state. Consequently, operating fluid having a predetermined pressure is supplied from the common operating fluid supply source 101 to the common fluid supplying device 41 (switching portion 48). The press-contact force that the first piston member 44a causes to act upon the sliding disc 43 is smaller when the predetermined pressure acts upon the second pressure chamber 49b than when the predetermined pressure acts upon the first pressure chamber 49a. This also causes a flexing amount of the sliding disc 43 to be smaller.

Further, the area of the second pressure-receiving surface 35b is one in which the predetermined pressure of the operating fluid causes the press-contact force that causes the main shaft 4a to be in the partially clamped state to act upon the sliding disc 43 by the braking portion 44c. Therefore, frictional force generated between the sliding surfaces 55 and the clamp surfaces 63 (braking surfaces) at this time is one allowing rotational resistance applied to the main shaft 4a by the clamping device 10 to rotate the main shaft 4a, so that the clamping device 10 causes the main shaft 4a to be in the partially clamped state. That is, in this case, the clamping device 10 functions as a partially clamping device, and the rotation indexing table device 1 rotates while the main shaft 4a is in the partially clamped state.

By the rotational resistance, variations in load from a cutter, which processes a workpiece, in the rotation indexing table device 1 when a finishing operation is performed on the workpiece while rotating it are reduced. Therefore, it is possible to reduce deviations in the rotational angle (the amount of rotation) of the rotation indexing table device 1 resulting from the variations in load from the cutter. This makes it possible to also reduce pulsation in the controlling of the DD motor 9 that is performed while correcting the deviation of the rotational angle (the amount of rotation). Therefore, the rotation state of the rotation indexing table device 1 can be stabilized to a uniform state. Since the clamping device 10 in the partially clamp state provides rigidity to the main shaft 4a in the rotation indexing table device 1, it is possible to increase the rigidity of the main shaft 4a without increasing the size of the bearings 3. As a result, it is possible to provide good surface roughness of a finished surface of the workpiece when a finishing operation is performed on the workpiece while rotating it by the clamping device 10 in the partially clamp state. In addition, it is possible to use a workpiece that is larger than a related workpiece using bearings 3 of the same diameter. Accordingly, since bearings 3 having a smaller diameter can be used, a high processing precision can be realized, and manufacturing costs of the rotation indexing table device 1 for the machine tool can be reduced. Further, without adjusting the pressure of the operating fluid that is the same as that of the common operating fluid supply source 101, the preset press-contact force that causes the main shaft 4a to be in the partially clamped state and the preset press-contact force that causes the main shaft 4a to be in the completely clamped state can be caused to act upon the main shaft 4a by the braking portion 44c of the clamping device 10.

In the embodiment shown in FIGS. 1 and 2, the first piston member 44a and the second piston member 44b are formed as two separate members. However, the present invention is not limited thereto. The first piston member 44a and the second piston member 44b may be formed as one member (clamp piston).

Figure 3:
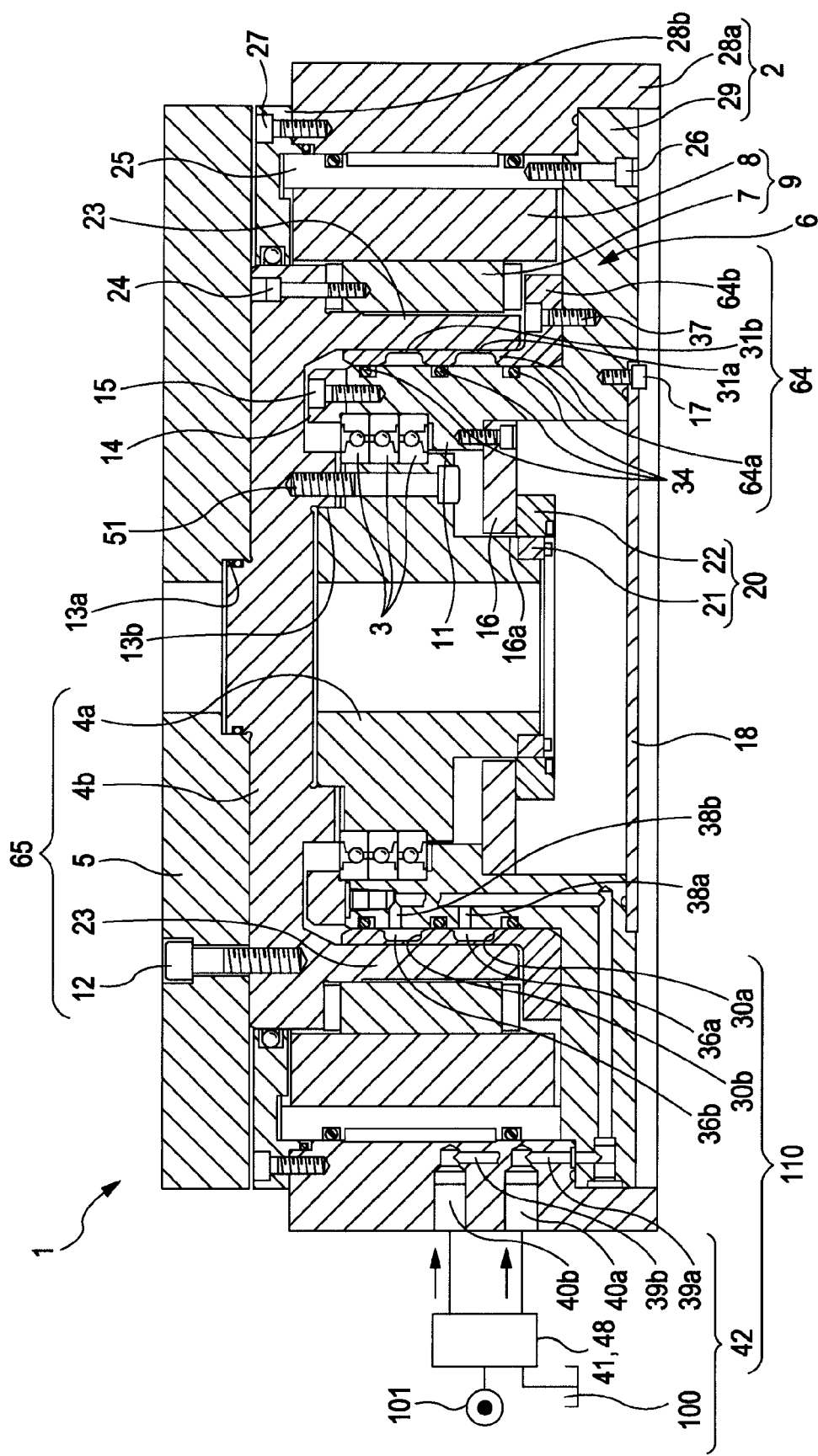
FIG. 3 is a side view of a second embodiment of a rotational resistance device of a main shaft driving device for a machine tool.

Next, a rotation indexing table device 1 according to a another embodiment of the present invention will be described with reference to FIGS. 3 and 4. FIG. 3 is a general view thereof, and shows an exemplary structure in which a clamp sleeve clamping device is used as a clamping device 110 of the rotation indexing table device 1. The rotation indexing table device 1 according to the embodiment has substantially the same structure as that shown in FIGS. 1 and 2 except that the structure of the clamping device 110 differs and that a sliding disc 43 that is mounted to the main shaft 4a is not provided. Therefore, parts corresponding to those shown in FIGS. 1 and 2 are given the same reference numerals in FIGS. 3 and 4, and will not be described below.

In FIG. 3, the clamping device 110 is a clamp sleeve clamping device in which a press-contact force (rotational resistance) is caused to act upon a main shaft 4a by a clamp sleeve 64 serving as a braking member. The clamping device 110 includes the clamp sleeve 64 (serving as a braking member), a first pressure chamber 36a, a second pressure chamber 36b, and an operating fluid supplying mechanism 42.

According to the embodiment shown in FIG. 3, the clamp sleeve 64 includes a cylindrical clamp portion 64a and a flange portion 64b. The cylindrical clamp portion 64a is disposed between a base portion 11 at a frame 2 and a holding portion 23 at a circular table 5. The flange portion 64b extends radially consecutively with the clamp portion 64a. The clamp portion 64a is fitted and mounted to the outer side of the base portion 11, and is mounted to a base member 29 at the frame 2 through the flange portion 64b with a mounting bolt 37. The clamp portion 64a is disposed so as to face and so as to be out of contact with the inner peripheral surface of the holding portion 23 serving as a sliding surface 33. The clamp portion 64a is in close contact with the outer peripheral surface of the base portion 11 through three seals 34.

The clamp sleeve 64 has two grooves (a first groove 30a and a second groove 30b) formed in the inner peripheral surface of the clamp portion 64a, and portions thereof corresponding to the grooves are thin-walled portions that are thin. A space surrounded by the inner surface of one of the grooves and the outer peripheral surface of the base portion 11 and a space surrounded by the inner surface of the other groove and the outer peripheral surface of the base portion 11 are a first pressure chamber 36a and a second pressure chamber 36b to which operating fluid (such as pressure oil) is supplied. In the clamp sleeve 64, operating fluid is supplied to the first pressure chamber 36a and the second pressure chamber 36b, so that the thin-wall portions (provided in correspondence with the first groove 30a and the second groove 30b) flex radially outward, thereby causing a press-contact force to act upon the main shaft 4a. Therefore, these thin-walled portions correspond to braking portions. The radially outward direction corresponds to a direction in which the braking portions cause the press-contact force to act upon the main shaft 4a. Surfaces at the sides of the first and second pressure chambers 36a and 36b in the thin-walled portions (that is, a first braking portion 31a and a second braking portion 31b), provided in correspondence with the first groove 30a and the second groove 30b, correspond to a pressure-receiving surface 35a and a pressure-receiving surface 35b, respectively.

In the embodiment, the first and second braking portions 31a and 31b are formed so that the areas of the pressure-receiving surfaces (that is, the first and second pressure-receiving surfaces 35a and 35b) differ from each other, and so that their thicknesses (dimensions in the radial direction) differ from each other. The first and second braking portions 31a and 31b are formed as a braking portion that generates a press-contact force for achieving a completely clamped state and a braking portion that generates a press-contact force for achieving a partially clamped state.

More specifically, the first braking portion 31a is such that its thickness and the area of the first pressure-receiving surface 35a are set so as not to allow rotation of the main shaft 4a caused by a press-contact force (rotational resistance) generated by a clamp surface 32 and a sliding surface 33 due to a predetermined pressure that the first pressure-receiving surface 35a receives by operating fluid supplied from a common operating fluid supply source 101. That is, the thin-walled portions are formed thin so that they can flex easily. The area of the first pressure-receiving surface 35a is such that, due to the relationship with the thickness of the thin-walled portion, a press-contact force that causes the main shaft 4a to be in the completely clamped state acts upon the main shaft 4a by the action of the predetermined pressure of the operating fluid.

The second braking portion 31b is formed as follows. That is, in order not to allow rotation of the main shaft 4a caused by a press-contact force (rotational resistance) generated by the clamp surface 32 and the sliding surface 33 due to a predetermined pressure that the second pressure-receiving surface 35b receives by operating fluid supplied from the common operating fluid supply source 101, the thin-walled portion is thicker than that of the thin-walled portion corresponding to the first braking portion 31a, the pressure-receiving surface 35b is made narrower than the first pressure-receiving surface 35a, and flexing amount and the press-contact force are less than those of the first braking portion 31a.

Although the first and second braking portions 31a and 31b are formed so that the areas of the first and second pressure-receiving surfaces 35a and 35b differ from each other and so that their thicknesses differ from each other as in the illustrated embodiment, the present invention is not limited thereto. Only the areas of the first and second pressure-receiving surfaces 35a and 35b may differ from each other, or only the thicknesses of the thin-walled portions may differ from each other.

The first pressure chamber 36a and the second pressure chamber 36b are connected to a fluid supplying device 41 (switching portion 48) of the operating fluid supplying mechanism 42 through different paths, that is, a first flow path 38a and a second flow path 38b (formed in the base member 29 of the frame 2), and a first communicating path 39a and a second communicating path 39b and a first port 40a and a second port 40b (formed in a casing member 28a), respectively.

Next, the operation of the rotation indexing table device 1 shown in FIGS. 3 and 4 will be described. First, when a workpiece on the circular table 5 is to be processed with the angular position of the main shaft 4a being indexed by rotating the main shaft 4a by a preset rotational angle, after indexing the angular position of the main shaft 4a by driving a DD motor 9, operating fluid is supplied only towards the first port 40a by a selector valve (not shown) in the liquid supplying device 41 (switching portion 48).

This causes the pressure of the operating fluid from the operating fluid supply source 101 to act upon the first pressure chamber 36a. By this, the first pressure-receiving surface 35a receives the pressure of the operating fluid, and, as shown by dotted lines in FIG. 4, the first braking portion 31a is deformed (flexed) in a diameter increasing direction and the clamp surface 32 comes into contact with the sliding surface 33. As a result, the first braking portion 31a causes a press-contact force to act upon the main shaft 4a.

As mentioned above, the first braking portion 31a is such that its thickness and the area of the first pressure-receiving surface 35a are set so that a rotational resistance does not allow rotation of the main shaft 4a caused by a press-contact force acting upon the sliding surface 33 by the clamp surface 32 when a predetermined pressure acts upon the first pressure-receiving surface 35a. Therefore, at this time, frictional resistance generated between the clamp surface 32 and the sliding surface 33 does not allow the rotational resistance applied to the main shaft 4a by a clamping device 110 to rotate the main shaft 4a. Consequently, the clamping device 110 sets the main shaft 4a in the completely clamped state. That is, in this case, the clamping device 10 functions as a completely clamping device that maintains the angular position of the main shaft 4a.

On the other hand, when a finishing operation is to be performed on a workpiece while rotating the circular table 5, a controlling device of a machine tool causes operating fluid to be supplied to the second port 40b by the selector valve in the liquid supplying device 41 (switching portion 48) of the operating fluid supplying mechanism 42.

This causes the pressure of the operating fluid to act upon the second pressure chamber 36b. The second pressure-receiving surface 35b receives the pressure of the operating fluid, and the second braking portion 31b is deformed (flexed) in a diameter increasing direction and the clamp surface 32 press-contacts the sliding surface 33. As a result, the second braking portion 31b causes a press-contact force to act upon the main shaft 4a.

The second braking portion 31b is such that its thickness and the area of the second pressure-receiving surface 35b are set so that a press-contact force that acts upon the sliding surface 33 by the clamp surface 32 when a predetermined pressure acts upon the second pressure-receiving surface 35b causes the main shaft 4a to be in the partially clamped state. Therefore, frictional resistance generated between the clamp surface 32 and the sliding surface 33 at this time allows rotational resistance applied to the main shaft 4a by the clamping device 110 to rotate the main shaft 4a, so that the clamping device 110 causes the main shaft 4a to be in the partially clamped state. That is, in this case, the clamping device 110 functions as a partially clamping device, and the rotation indexing table device 1 rotates while in the partially clamp state.

Figure 4:
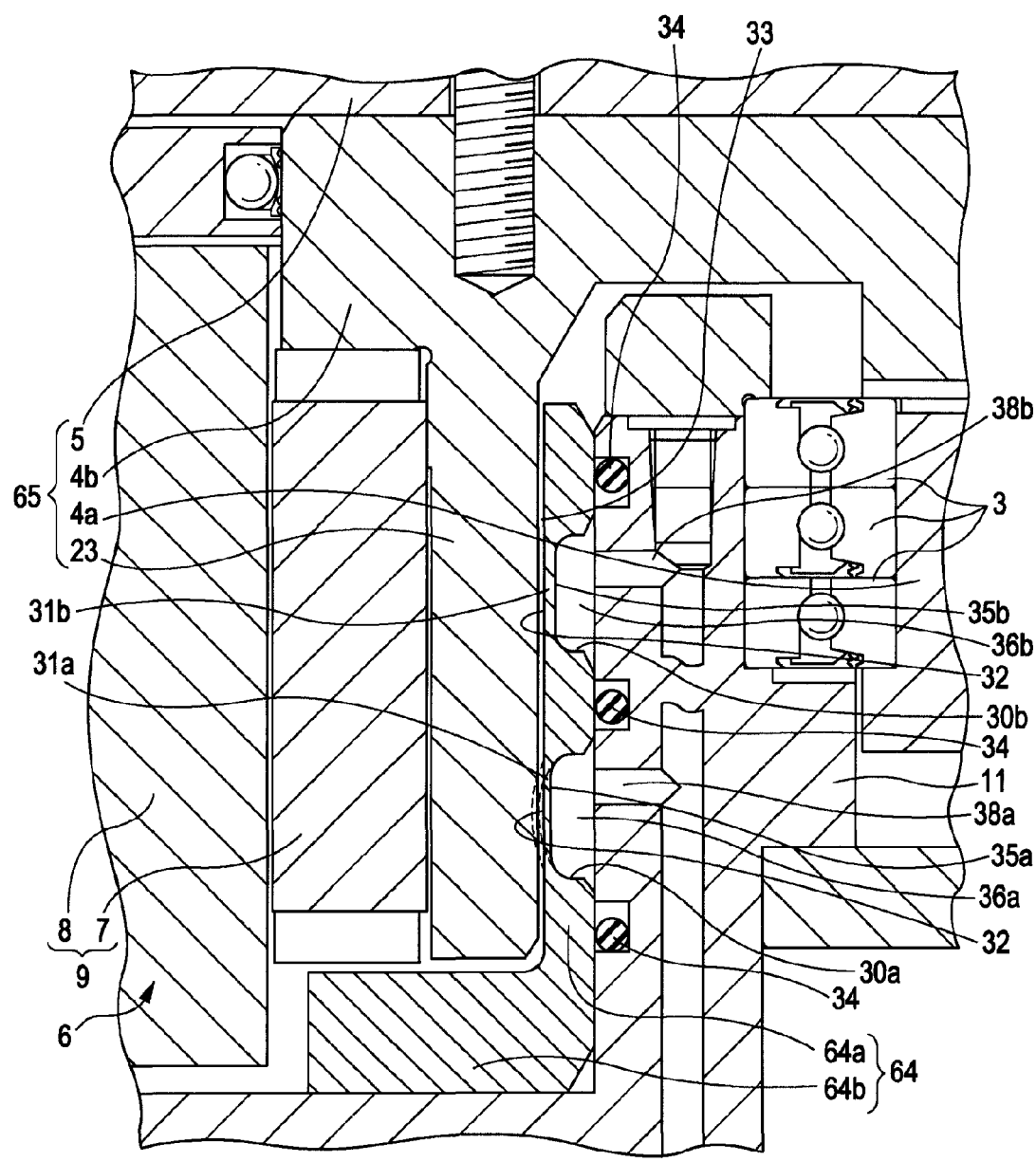
FIG. 4 is an enlarged explanatory diagram of the second embodiment of the rotational resistance device of the main shaft driving device for the machine tool.
Figure 5:
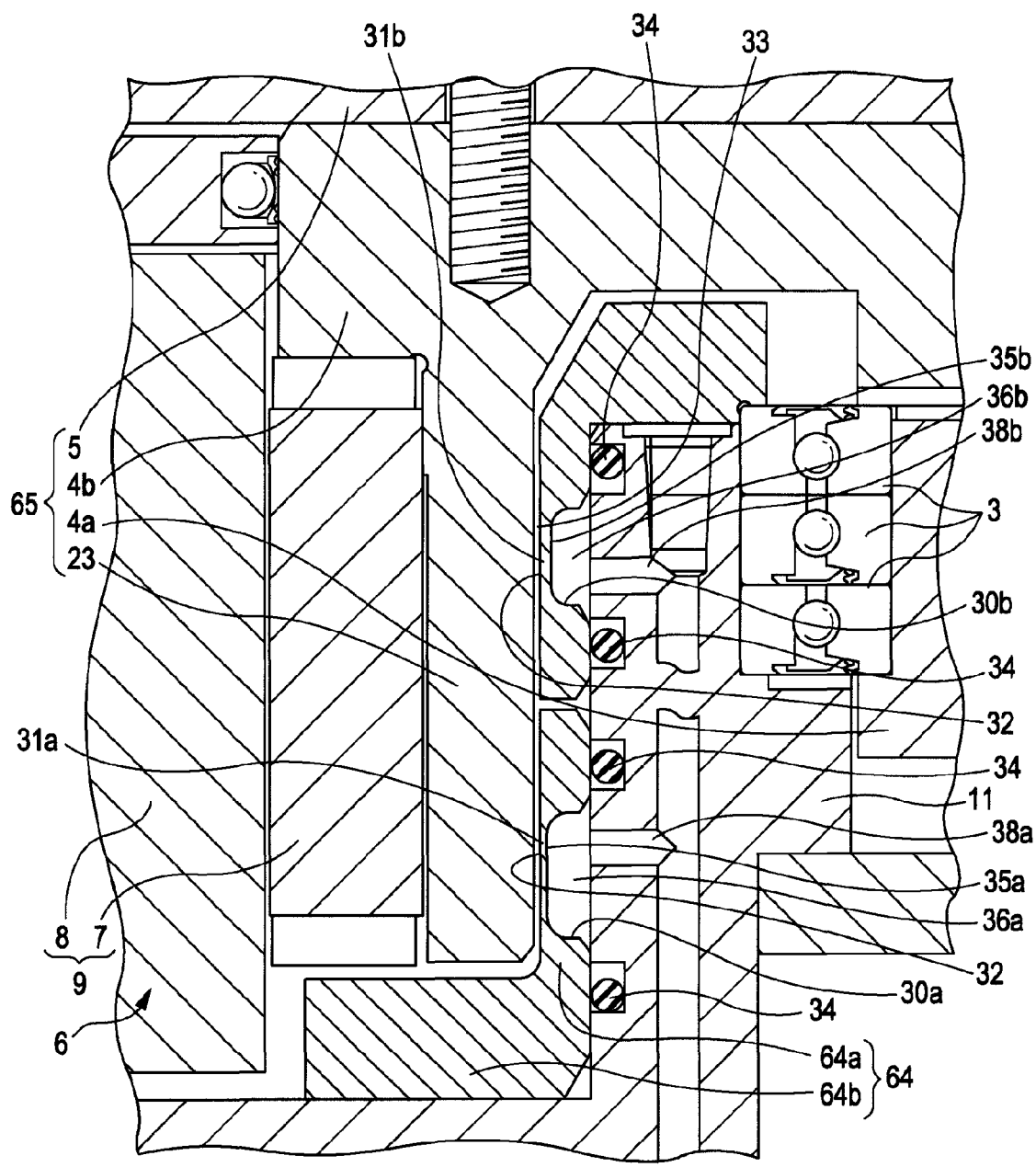
FIG. 5 is an enlarged explanatory diagram of the second embodiment of the rotational resistance device of the main shaft driving device for the machine tool.

In the embodiment shown in FIGS. 3 and 4, the clamp sleeve 64 is an integrated member having two grooves (that is, the first groove 30a and the second groove 30b). However, as shown in FIG. 5, the clamp sleeve 64 may be formed of two members, that is, a first member and a second member, and grooves may be formed in the members. In FIG. 5, the second member and the aforementioned bearing holder 14 are integrally formed with each other, and a flange portion of the second member serves as the bearing holder.

Figure 6:
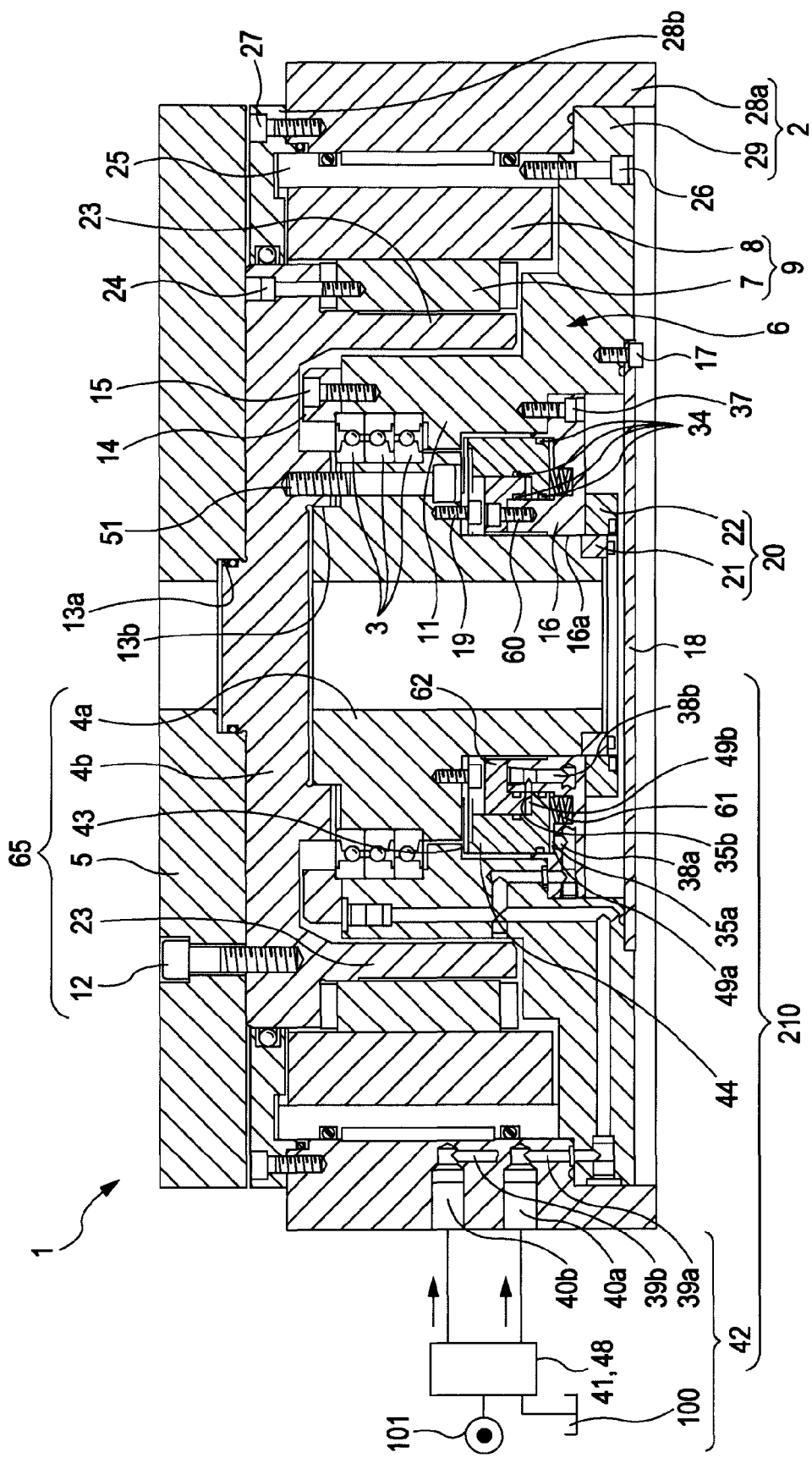
FIG. 6 is a side view of a third embodiment of a rotational resistance device of a main shaft driving device for a machine tool.

A rotation indexing table device 1 according to still another embodiment of the present invention will be described with reference to FIGS. 6 and 7. FIG. 6 is a general view thereof, and shows an exemplary structure in which a disc clamping device is used as a clamping device 210 of the rotation indexing table device 1. The rotation indexing table device 1 according to the embodiment has substantially the same structure as that shown in FIGS. 1 and 2 except that the structure of the clamping device 210 differs. Therefore, parts corresponding to those shown in FIGS. 1 and 2 are given the same reference numerals in FIGS. 6 and 7, and will not be described below.

In FIG. 6, the clamping device 210 causes a press-contact force (rotational resistance) to act upon a sliding disc 43, mounted to a main shaft 4a, by a clamp piston 44 (serving as a braking member), and is a disc clamping device as in the embodiment shown in FIGS. 1 and 2. Similarly to the previous embodiments, the clamp piston includes a first pressure-receiving surface 35a and a second pressure-receiving surface 35b. However, in the embodiment, as a portion that differs from that in the embodiment shown in FIGS. 1 and 2, the second pressure-receiving surface 35b is provided with an unclamping function.

The clamp piston 44 serving as a braking member is formed as a single member in the illustrated embodiment. The clamp piston 44 is accommodated in an annular first groove 30a, formed in a projecting portion 16, so as to be movable in an axial direction. The first groove 30a is formed in a portion facing the sliding disc 43 in the projecting portion 16 so as to open towards the sliding disc 43. Therefore, the clamp piston 44 accommodated in the first groove 30a is such that its circular-table-5-side end surface (=sliding-disc-43-side end surface) faces the sliding disc 43.

The clamp piston 44 is provided with an annular projecting portion at a portion situated at the outer peripheral side of the sliding-disc-43-side end surface so as to face the clamp surface 63. The projecting portion contacts the sliding disc 43 and causes a press-contact force to act thereupon when the clamp piston 44 is displaced towards the sliding disc 43, and corresponds to a braking portion 44c according to the present invention. In the embodiment, the braking portion 44c causes a press-contact force to act upon the sliding disc 43 in the direction of the circular table 5 in the axial direction. This direction corresponds to "a first direction, which is the same as a direction in which the braking portion causes the press-contact force to act upon the main shaft," in the present invention.

The clamp piston 44 has an annular projecting portion 44b formed in the lower end of the inner peripheral portion thereof and projecting towards the inner peripheral side. The inner peripheral surface of the projecting portion 44b is in close contact with the inner peripheral surface of the first groove 30a through a seal 34.

At a location between the projecting portion 44b and the sliding disc 43, an annular flange member 62 is mounted to a sliding-disc-43-side end surface of the projecting portion 16 with a mounting bolt 60. The outer peripheral surface of the flange member 62 is in close contact with the inner peripheral surface of the clamp piston 44 through a seal 34.

A space surrounded by the lower end surface of the clamp piston 44 (end surface at a side opposite to the sliding disc 43) including the projecting portion 44b and the first groove 30a is a first pressure chamber 49a. A space surrounded by the sliding-disc-43-side end surface of the projecting portion 16, the inner peripheral surface of the clamp piston 44, the flange member 62, and the inner peripheral surface of the first groove 30a is a second pressure chamber 49b is a second pressure chamber 49b to which operating fluid is supplied for causing the clamping device 210 to be in an unclamp state while the clamp piston 44 is displaced in a direction opposite to the first direction, that is, a press-contact force of the clamp piston 44 does not act upon the sliding disc 43.

Here, the lower end surface of the clamp piston 44 corresponds to the first pressure-receiving surface 35a extending in a second direction (which is orthogonal to the first direction) and receiving the pressure of an operating fluid in the first direction. Further, a sliding-disc-43-side end surface of the projecting portion 44b of the clamp piston 44, that is, a surface facing the flange member 62 corresponds to the second pressure-receiving surface 35b extending in the second direction and receiving the pressure of operating fluid in a direction opposite to the first direction.

Spring members 61 are provided in the first pressure chamber 49a. The spring members 61 are compression springs and are provided between the bottom surface of the first groove 30a and the first pressure-receiving surface 35a. Spring force acts upon the first pressure-receiving surface 35a to urge the clamp piston 44 in the first direction. The magnitude of the spring force of each spring member 61 is set so that a press-contact force that causes the main shaft 4a to be in a partially clamped state acts upon the main shaft 4a by the braking portion 44c.

The area of the first pressure-receiving surface 35a is such that a press-contact force that causes the main shaft 4a to be in a completely clamped state by the action of a predetermined pressure of an operating fluid as well as the action of the spring force of each spring member 61 is caused to act upon the main shaft 4a (sliding disc 43) by the braking portion 44c. The area of the second pressure-receiving surface 35b is such that a pressing force that is larger than the urging force is caused to act upon the spring member 61 by the clamp piston 44 as a result of the action of the predetermined pressure of the operating fluid.

Accordingly, the first pressure chamber 49a functions as a pressure chamber that generates a press-contact force for achieving a completely clamped state, and the second pressure chamber 49b functions as a pressure chamber that generates a force opposing the urging force of each spring member 61 for achieving an unclamped state.

A first flow path 38a of an operating fluid supplying mechanism 42 is formed in the projecting portion 16, and communicates with the first pressure chamber 49a at a location facing the first pressure-receiving surface 35a. The first flow path 38a communicates with a first port 40a (formed so as to open towards the outer surface of a casing member 28a) through a first communication path 39a (formed in the casing member 28a). The first port 40a is connected to a fluid supplying device 41 provided separately from a frame 2.

A second flow path 38b is formed in the projecting portion 16, and communicates with the second pressure chamber 49b at a location between the second pressure-receiving surface 35b and the flange member 62 at the inner peripheral surface of the first groove 30a. The second flow path 38a communicates with a second port 40b (formed so as to open towards the outer surface of the casing member 28a) through a second communication path 39a (formed in the casing member 28a). The second port 40b is connected to the fluid supplying device 41 provided separately from the frame 2.

Next, the operation of the rotation indexing table device 1 shown in FIGS. 6 and 7 will be described. First, when the angular position of the main shaft 4a is to be indexed, as in the previous embodiments, the fluid supplying device 41 (switching portion 48) is controlled by a controlling device of a machine tool, and operating fluid is supplied to the second port 40b.

This causes the pressure of the operating fluid from the operating fluid supply source 101 to act upon the second pressure chamber 49b, the second pressure-receiving surface 35b to receive the pressure of the operating fluid, and the clamp piston 44 to be pushed in a direction opposite to the first direction. In addition, the clamp piston 44 opposes the urging force of each spring member 61 and is displaced in the direction opposite to the first direction, so that the clamp surface 63 (braking surface) at an end of the braking portion 44c of the clamp piston 44 is separated from one of sliding surfaces 55 of the sliding disc 43. Therefore, the clamping device 210 indexes the angular position of the main shaft 4a by driving a DD motor 9.

After indexing the angular position as mentioned above, when processing is performed in a completely clamped state, the fluid supplying device 41 (switching portion 48) causes a flow path at a side of the second port 40b to communicate with a tank 100 and causes operating fluid to be supplied to a flow path at a side of the first port 40a. By this, the pressure of the operating fluid no longer acts upon the second pressure chamber 49b, and acts upon the first pressure chamber 49a. The first pressure-receiving surface 35a receives the pressure of the operating fluid in addition to the urging force of each spring member 61, and the clamp piston 44 is displaced towards the sliding disc 43. In addition, as shown in FIG. 7, the clamp surface 63 at the end (braking portion 44c) of the clamp piston 44 press-contacts one of the sliding surfaces 55 of the sliding disc 43, thereby flexing and deforming the sliding disc 43. The other sliding surface 55 of the sliding disc 43 press-contacts the clamp surface 63 at the base portion 11.

Here, the frictional resistances generated between the clamp surfaces 63 and the sliding surfaces 55 do not allow the rotational resistance applied to the main shaft 4a by the clamping device 210 to rotate the main shaft 4a.

On the other hand, when a finishing operation is performed on a workpiece by rotating it, the fluid supplying device 41 (switching portion 48) causes the flow paths for the first and second ports 40a and 40b to communicate with the tank 100.

As a result, the pressure of the operating fluid no longer acts upon the first pressure chamber 49a and the second pressure chamber 49b, thereby reducing the internal pressures of the first and second pressure chambers 49a and 49b. Since the pressure of the operating fluid no longer acts upon the first pressure-receiving surface 35a and the second pressure-receiving surface 35b too, the first pressure-receiving surface 35a only receives the urging force of each spring member 61. Therefore, the braking portion 44c of the clamp piston 44 causes a press-contact force to act upon the sliding disc 43 by only the urging force of each spring member 61. Frictional forces between the sliding surfaces 55 and the clamp surfaces 63 (braking surfaces) at this time allow the rotational resistance applied to the main shaft 4a by the clamping device 210 to rotate the main shaft 4a. The clamping device 210 causes the main shaft 4a to be in a partially clamped state. That is, the clamping device 210 functions as a partially clamping device, and the rotation indexing table device 1 rotates while the main shaft 4a is in the partially clamped state.

Figure 7:
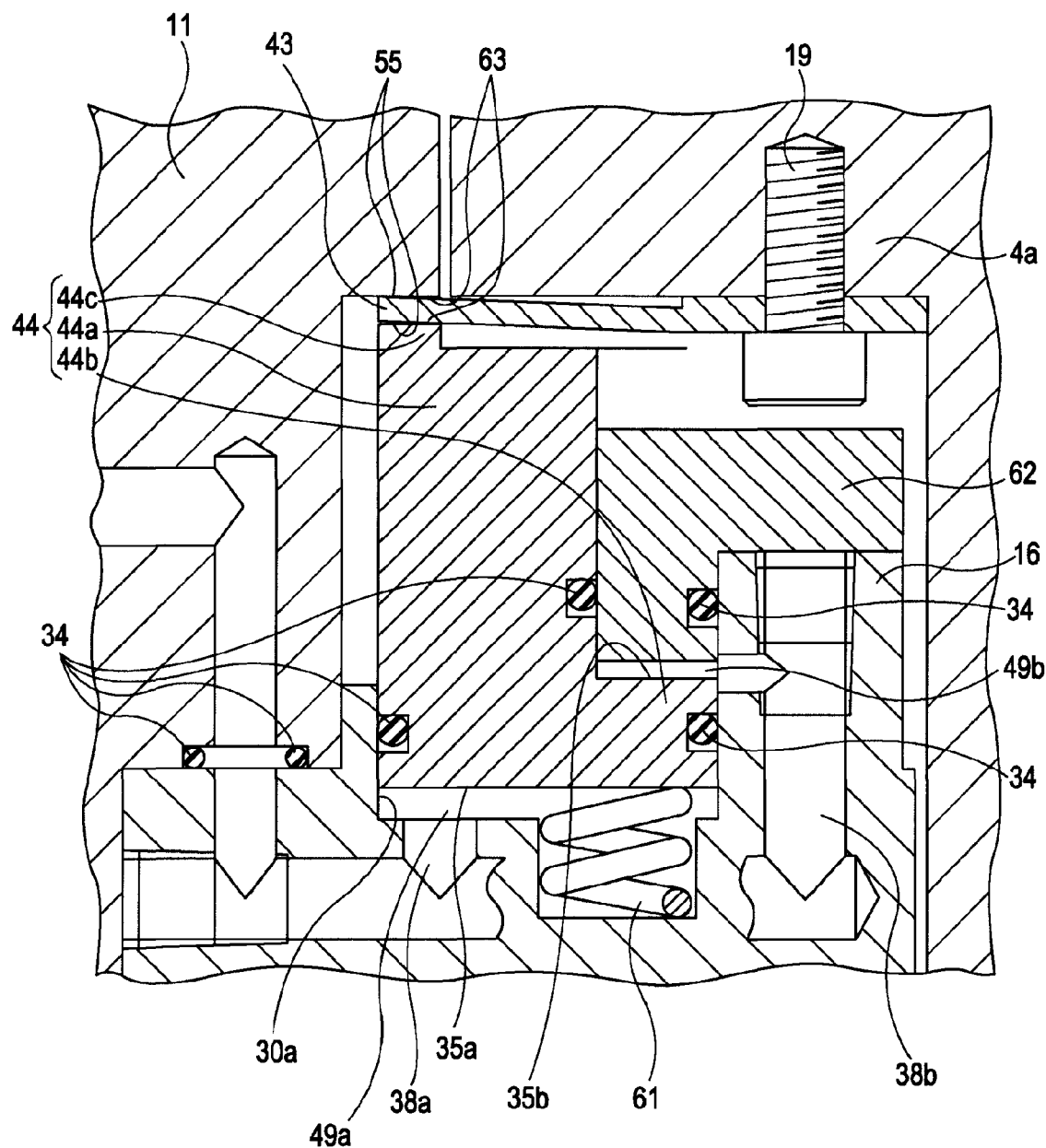
FIG. 7 is an enlarged explanatory diagram of the third embodiment of the rotational resistance device of the main shaft driving device for the machine tool.
Figure 8:
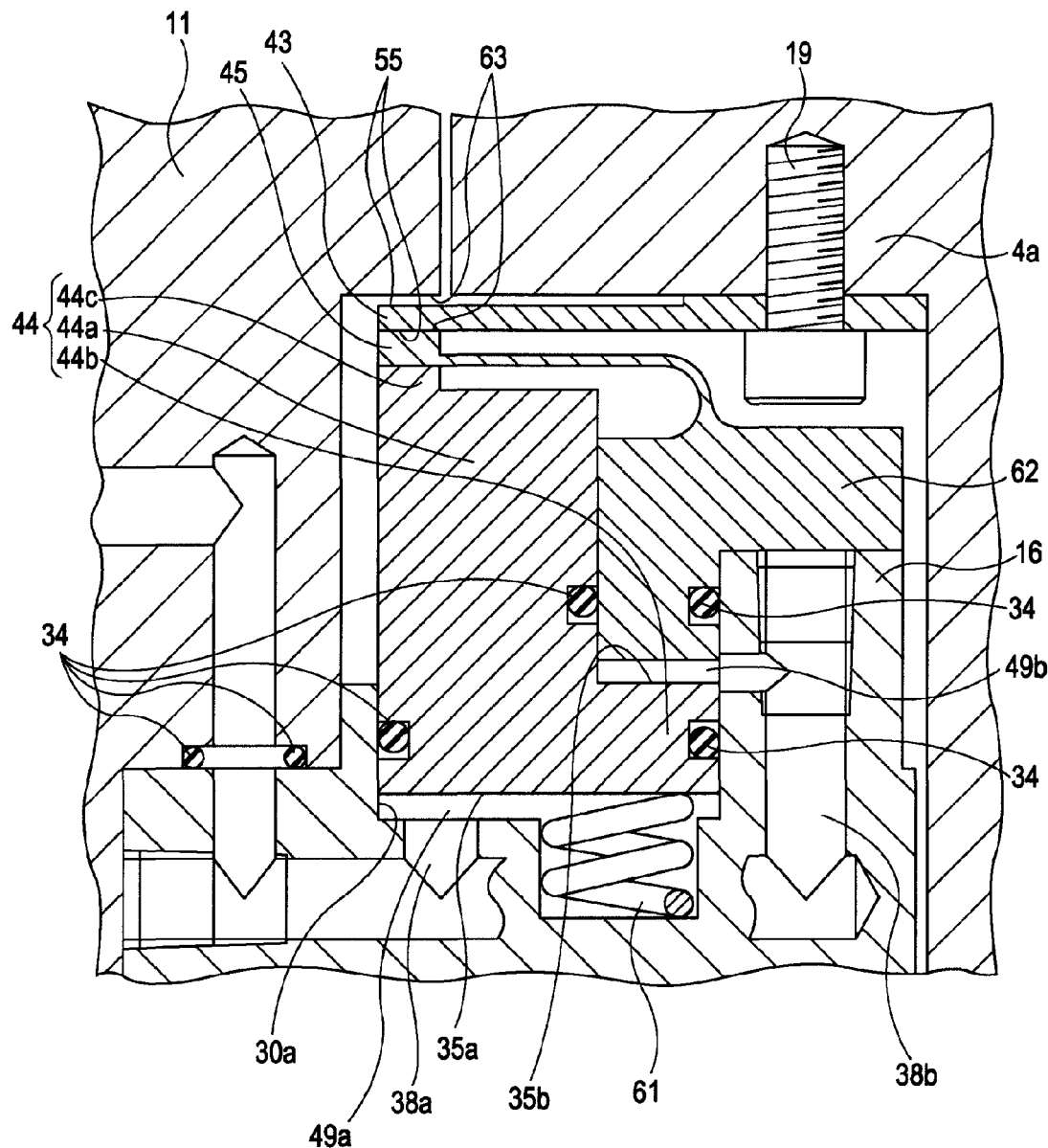
FIG. 8 is an enlarged explanatory diagram of the third embodiment of the rotational resistance device of the main shaft driving device for the machine tool.

Although, in the embodiment shown in FIGS. 6 and 7, the braking portion 44c is formed so as to directly push the sliding disc 43, the present invention is not limited thereto. As shown in FIG. 8, the braking portion 44c may be formed so as to push the sliding disc 43 through a return disc 45.

In the embodiment shown in FIGS. 6 and 7, in the partially clamped state, the sliding disc 43 is such that one of the sliding surfaces 55 receives a press-contact force from the braking portion 44c and the other sliding surface 55 press-contacts the clamp surface 63 at the base portion 11. However, the present invention is not limited thereto. The sliding disc 43 may be such that the other sliding surface 55 does not contact the clamp surface 63 at the base portion 11, and only the one of the sliding surfaces 55 contacts the braking portion 44c while the one of the sliding surfaces 55 receives a press-contact force.

Figure 9:
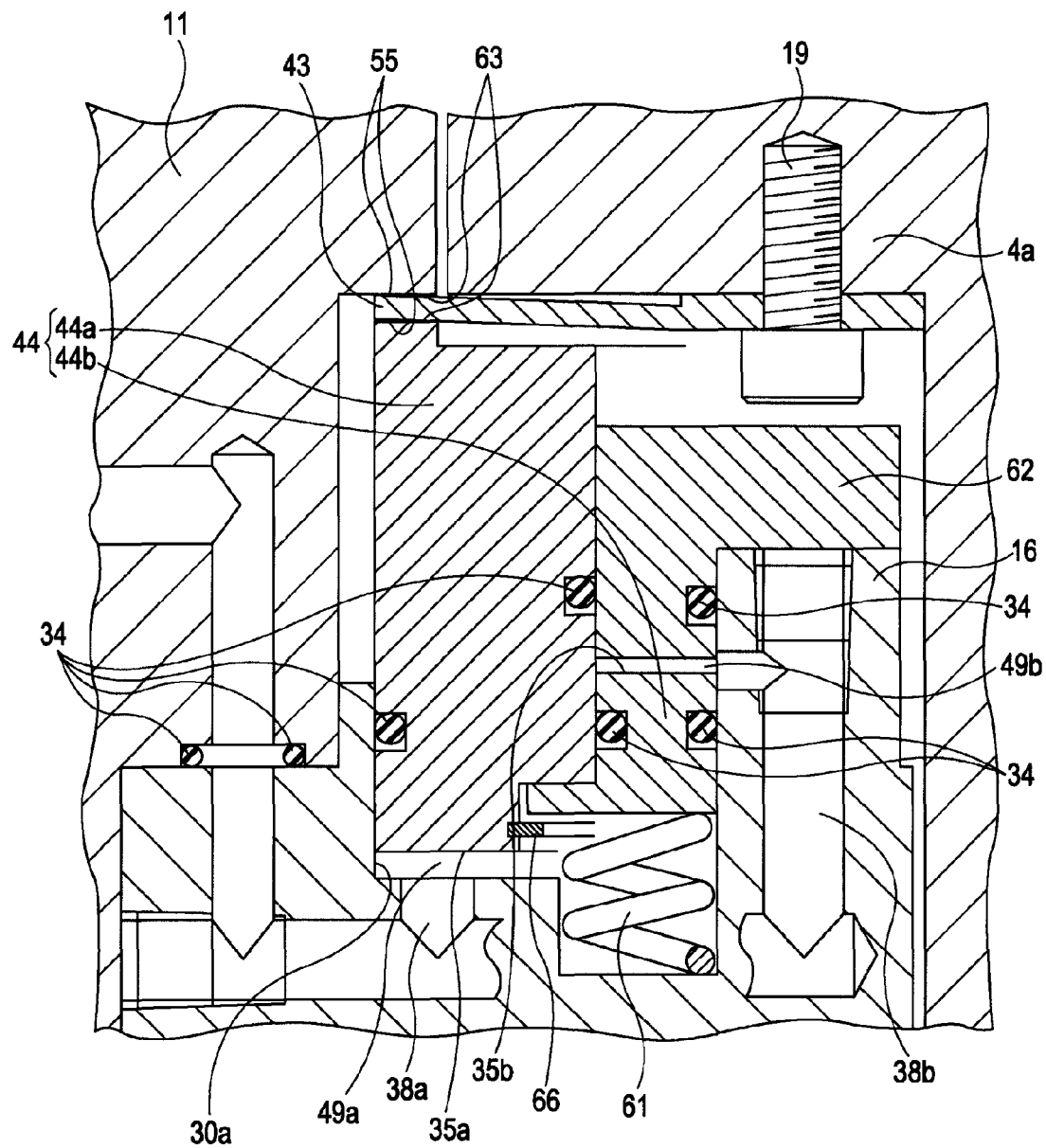
FIG. 9 is an enlarged explanatory diagram of the third embodiment of the rotational resistance device of the main shaft driving device for the machine tool.

Further, although, in the embodiment shown in FIGS. 6 and 7, the clamp piston 44 is formed as a single member, the present invention is not limited thereto. As shown in FIG. 9, the clamp piston 44 may include two piston members, that is, a piston member 44a and a piston member 44b.

The clamping device of the main shaft driving device in the machine tool according to the present invention is mounted to the machine tool as an installation device of the machine tool or as a device attached later to various machine tools.

What is claimed is:

1. A clamping device in a main shaft driving device for a machine tool, the main shaft driving device rotationally driving a main shaft by a driving device, the main shaft being rotatably supported by a frame and having a member that is rotationally driven secured to an end portion thereof, the clamping device comprising:

a sliding disc that is secured to the main shaft;

a clamp piston that is provided so as to be displaceable in an axial direction of the main shaft with respect to the frame, the clamp piston including a pressure-receiving surface and a braking portion, the pressure-receiving surface receiving pressure of an operating fluid, the braking portion causing a press-contact force to act upon the sliding disc;

a pressure chamber formed by the pressure-receiving surface and the frame; and an operating fluid supplying mechanism provided for supplying the operating fluid from an operating fluid supply source to the pressure chamber, wherein by displacing the clamp piston towards the sliding disc by the pressure of the operating fluid that is supplied to the pressure chamber, the clamp piston causes the press-contact force to act upon the sliding disc by the braking portion to bring the sliding disc into contact with the frame, so that, by frictional force generated between the braking portion and the sliding disc and frictional force generated between a clamp surface at the frame and the sliding disc, rotational resistance is applied to the main shaft through the sliding disc, wherein the clamping device includes a spring member that urges the clamp piston in a first direction, which is the same as a direction in which the braking portion causes the press-contact force to act upon the sliding disc, the spring member causing a spring force to act upon the pressure-receiving surface, the spring force causing the press-contact force to act upon the sliding disc by the braking portion, the press-contact force causing a partially clamped state to be set, the partially clamped state being a state in which the press-contact force that causes the application of the rotational resistance allowing the rotation of the main shaft acts upon the sliding disc, wherein the clamp piston has a first pressure-receiving surface and a second pressure-receiving surface, the first pressure-receiving surface extending in a second direction that is orthogonal to the first direction and receiving pressure of the operating fluid in the first direction, the first pressure-receiving surface receiving the spring force of the spring member, the second pressure-receiving surface extending in the second direction and receiving pressure of the operating fluid in a direction opposite to the first direction, and wherein the operating fluid supplying mechanism includes a switching portion that selectively supplies the corresponding operating fluid from the operating fluid supply source to at least one of a first pressure chamber and a second pressure chamber, the first pressure chamber being formed by the first pressure-receiving surface and the frame, the second pressure chamber being formed by the second pressure-receiving surface and the frame.

\* \* \* \* \*